United States Patent [19]

Adams et al.

[11] 3,819,360

[45] June 25, 1974

[54] METHOD OF FORMING TACONITE PELLETS WITH A DOUBLE SULFATE SALT BINDER

[75] Inventors: Albert Adams, Oklahoma City, Okla.; Edward A. Chowning, Carlsbad, N. Mex.

[73] Assignee: International Mineral & Chemical Corporation, Libertyville, Ill.

[22] Filed: Mar. 5, 1973

[21] Appl. No.: 338,096

[52] U.S. Cl. .................................. 75/3, 106/105
[51] Int. Cl. .................................. C21b 1/24
[58] Field of Search .......... 75/3, 4, 5; 423/551, 554; 106/105, 121

[56] References Cited
UNITED STATES PATENTS

| | | | |
|---|---|---|---|
| 1,168,401 | 1/1916 | Kippe | 75/3 |
| 2,703,762 | 3/1955 | Slayter | 106/121 X |
| 2,914,394 | 11/1959 | Dohmen | 75/3 |
| 3,329,515 | 7/1967 | Leopold | 106/105 X |

*Primary Examiner*—Helen M. McCarthy
*Assistant Examiner*—Thomas A. Waltz
*Attorney, Agent, or Firm*—James E. Wolber; Peter Andress

[57] ABSTRACT

Taconite fines are pelletized by adding to the taconite 2 to 4 percent by weight of a double salt of potash-magnesia, preferably dissolved in an amount of water equivalent to about 10 to 15 percent by weight of the taconite. The resulting mass is mixed and formed into pellets by granulation or briquetting techniques. The pellets are allowed to cure and then dry to a water content of about 1 to 2 percent.

7 Claims, No Drawings

METHOD OF FORMING TACONITE PELLETS WITH A DOUBLE SULFATE SALT BINDER

BACKGROUND OF THE INVENTION

In the beneficiation of low grade iron ores for use in the blast furnace, and particularly as illustrated by the case of taconite, it is necessary to grind the ores to a very fine state, generally −100 mesh, in order to liberate the taconite from impurities and permit separation of the impurities, chiefly silica, by beneficiation techniques. The resulting concentrates, because of their fineness, are unsuitable for use in a metallurgical furnace.

Due to dusting and packing tendency of taconite concentrates in such finely particulate state, there is great difficulty in handling and transporting it. Therefore, it has been found desirable to agglomerate such finely divided concentrates into relatively large size lumps or pellets which can be conviently handled, transported, and smelted. The pellets may be of any convenient size, but are commonly about ½ inch in the largest dimension.

A considerable load is applied to the pellets when they are placed in the blast furnace and come under the loading pressure of a tall column of material. The pellets must display strength in the blast furnace to avoid having the lower levels of pellets crushed by the weight of the pellets above them. Such breakdown would tend to make the charge impervious to the passage of high temperature reducing gases that must be blown through the charge. Accordingly, there is a need to produce pellets of high strength at minimal cost using binders, which will not substantially adversely affect the smelting process.

Numerous binders have been proposed in the prior art. Among the commonly used binders are clays and cements which, unfortunately, tend to be high in silica and therefore re-introduce into the product one of the principal contaminants removed in beneficiation. In all such prior art techniques, as in the instant invention, a mixture of taconite and binder is formed into a pellet by any of several well-known techniques. These techniques include drum or pan granulation, compaction, extrusion, or briquetting under pressure between rollers. Any of these techniques may be used in accordance with the instant invention.

DESCRIPTION OF THE INVENTION

In accordance with this invention taconite pellets of high strength are prepared by adding to a finely divided taconite batch a double sulfate salt of potash magnesia in the amount of about 2 percent to about 4 percent by weight of the taconite, and water in the amount of about 10 percent to about 15 percent by weight of the taconite. The resulting mass is mixed thoroughly to wet the taconite particles, and the mass is formed into pellets. The pellets are preferably cured for a period of about 20 min. to 2 hrs. and then dried to a residual water content of about 1 percent to about 2 percent by weight of the taconite.

In a distinctly preferred embodiment of the instant invention the double sulfate salt of potash magnesia in the amount of 2 to 4 percent by weight of the taconite, and more preferably in the amount of 2½ to 3 percent by weight of the taconite, is first dissolved in water in the amount of 15 percent by weight of the taconite, and the resulting solution is then added to the taconite. The resulting mass is then thoroughly mixed, as in a pug mill, to distribute the solution and thoroughly wet the taconite particles.

The resulting mixed mass is then formed into pellets by conventional prior art techniques such as drum or pan granulation or briquetting between rollers. The resulting pellets are initially low in strength and require careful handling. The green pellets, however, develop strength quickly and will withstand normal handling after about 20 to 30 min. Full strength is reached after about 2 hrs. It is accordingly preferred that the pellets be cured for at least 20 min., preferably for 30 min., and still more preferably for a longer period, up to 2 hrs., before drying. The pellets are dried conventionally, as in a rotary drier, to a residual water content of about 1 percent to about 2 percent by weight. Reducing the water content below about 1% materially adversely affects the strength of the pellet.

By the phrase "double sulfate salt of potash magnesia" is meant magnesium sulfate potassium sulfate double salts such as langbeinite ($2MgSO_4 \cdot K_2SO_4$); leonite ($MgSO_4 \cdot K_2SO_4 \cdot 4H_2O$); and schoenite ($MgSO_4 \cdot K_2SO_4 \cdot 6H_2O$). Langbeinite is an especially preferred, naturally occurring double salt mined chiefly in the Carlsbad region of New Mexico.

As a specific example of the instant invention, 1,000 lbs. of taconite concentrate which is essentially −100 +375 Tyler mesh, is formed into pellets. A binder solution is prepared by dissolving 28 lbs. of langbeinite in 140 lbs. of water. The resulting solution and the finely divided taconite are thoroughly mixed in a pug mill and the resulting mass is granulated in a pan granulator to produce essentially spherical pellets about ½ in. in diameter. The resulting pellets are cured for 30 min. at ambient temperature and then introduced into a counter-current gas-fired rotary drier and dried to a residual moisture content of 1½ percent by weight of the taconite. The product temperature at drier discharge is 230°F.

What is claimed is:

1. The method of forming taconite pellets from finely divided particulate taconite comprising adding to the particulate taconite a double sulfate salt of potash magnesia in the amount of about 2 percent to about 4 percent by weight of the taconite and water in the amount of about 10 percent to about 15 percent by weight of the taconite, mixing the resulting mass thoroughly with the taconite particles, forming the mass into pellets, and drying the pellets at an elevated temperature to a residual water content of about 1 to 2 percent by weight of the taconite.

2. The method in accordance with claim 1 in which said salt is langbeinite.

3. The method in accordance with claim 1 including the step of curing the pellets at essentially ambient temperature for a period of about 20 min. to 2 hrs. before the drying step.

4. A method in accordance with claim 3 in which said double salt is first dissolved in said water and the resulting solution is added to the particulate taconite.

5. A method in accordance with claim 4 in which the double salt is langbeinite.

6. A method in accordance with claim 4 in which the double salt is leonite.

7. A method in accordance with claim 4 in which the double salt is schoenite.

* * * * *